Aug. 3, 1937.  J. F. DONOVAN ET AL  2,089,053
APPARATUS FOR TESTING LAMPS
Filed Dec. 12, 1934
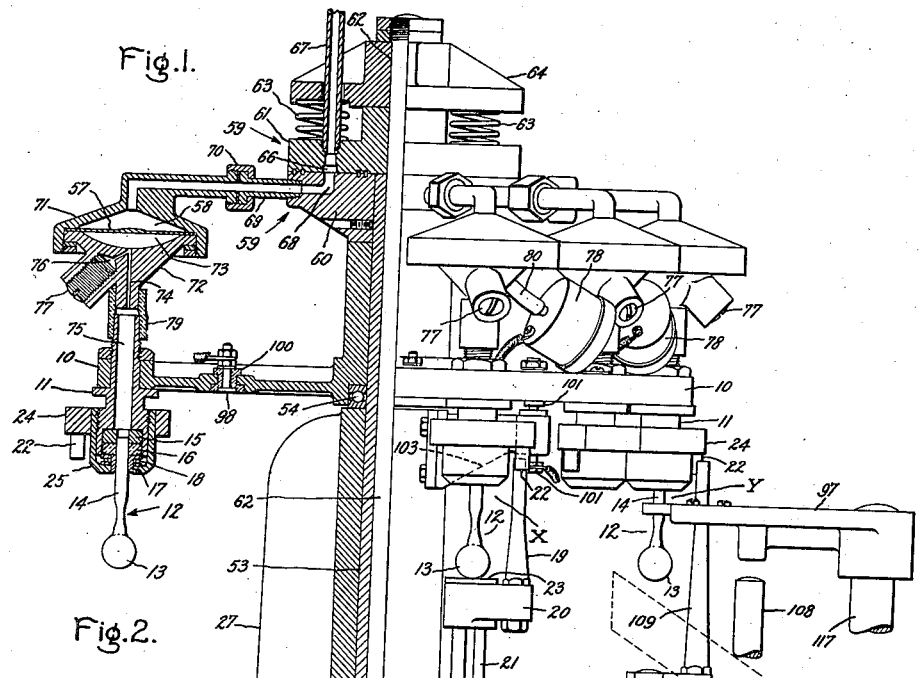
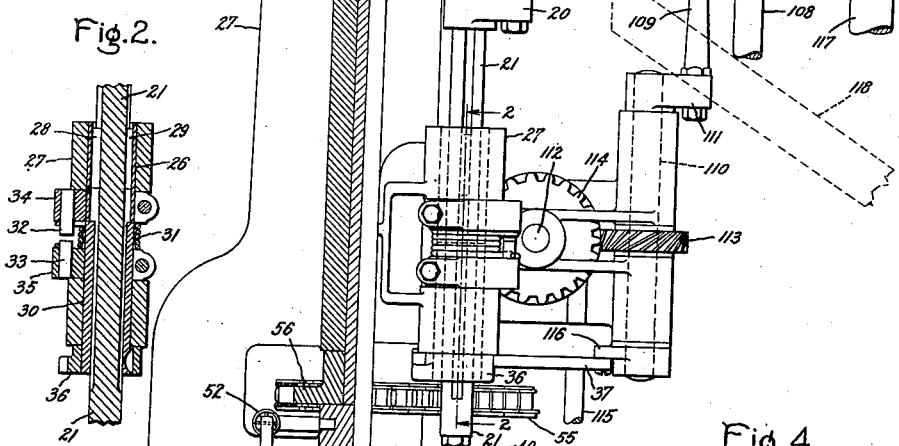
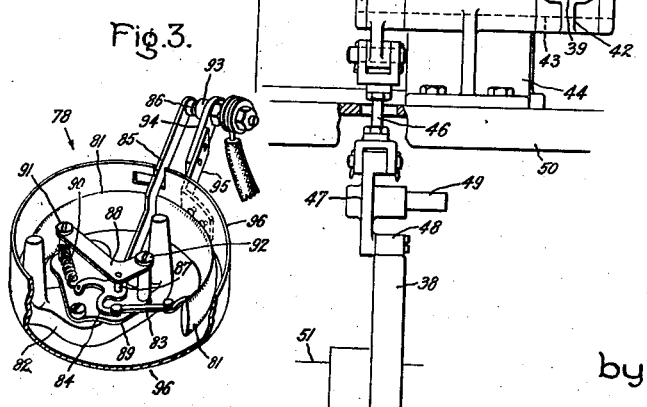
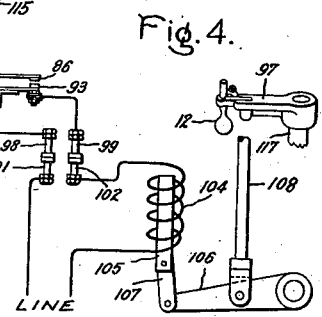
Inventors:
John F. Donovan,
George Illingworth,
by Harry E. Dunham
Their Attorney.

Patented Aug. 3, 1937

2,089,053

UNITED STATES PATENT OFFICE 2,089,053

APPARATUS FOR TESTING LAMPS

John F. Donovan and George Illingworth, East Cleveland, Ohio, assignors to General Electric Company, a corporation of New York Application December 12, 1934, Serial No. 757,169

6 Claims. (Cl. 73—51)

Our invention relates to apparatus for testing containers or envelopes for leaks, and more particularly to apparatus for testing electric lamps or similar articles for leaks before they have been exhausted or sealed off.

It is desirable that leaky lamps be detected and discarded before they are exhausted because of the danger of contamination of other lamps by the air drawn into the exhausting machine through the leaky lamp. This happens because of the fact that a number of lamps are connected to the exhaust pump by a single passage and the air entering the leaky lamp has access to the other lamps by means of said passage. The elimination of the leaky lamp at this stage also prevents further work being done thereon uselessly, such as sealing-off the bulb and providing it with a base.

One of the objects of our invention is to provide an automatic apparatus for performing the above-mentioned functions. Another object is to provide such an apparatus which will successfully detect lamps having slow leaks therein and lamps which, although not having apparent leaks therein at the time of testing, would subsequently develop a leak after being put in use.

Our apparatus is particularly adaptable for testing so-called "butt-seal" lamps in which the exhaust tube is joined to the neck of the bulb and the lead wires are sealed in the glass of this joint. The joint in this type of lamp cannot be easily inspected. This type of joint is generally used in the smaller and less expensive lamps and it is therefore highly desirable to use a completely automatic apparatus to keep the cost down.

Further features and advantages of our invention will appear from the following description of species thereof and from the drawing.

In the drawing, Fig. 1 is a side elevation partially in section of a testing machine comprising our invention; Fig. 2 is a vertical section along lines 2—2 of Fig. 1; Fig. 3 is a perspective view of a leak detecting switch for causing a defective lamp to be discarded; and Fig. 4 is a diagrammatic representation of mechanism including an electrical circuit for effecting the discarding of a defective lamp.

The machine shown in the drawing comprises a turret 10 which carries a plurality of heads or chucks 11 in which the lamps 12 to be tested are inserted. Each of the lamps 12 comprises a glass bulb or enclosure 13 in which a filament and other internal structure are sealed and to which is sealed an exhaust tube 14. At this stage in the manufacture of the lamp there should of course be no opening to the interior of the bulb except the passage through the exhaust tube but defective manufacture and improper handling sometimes cause other small openings to appear. These openings may be in the form of cracks caused by imperfect sealing of the tube to the bulb. The lamps are placed in the turret chuck or head 11 located at position $x$ by inserting the exhaust tube 14 therein. The end of the exhaust tube is held, as shown in the sectioned chuck 11 at the left of Fig. 1, in the bushing 15, rubber washer 16 and ferrule 17 of ball bearing 18.

After insertion of the lamp, mechanism is operated to close the chuck 11 and make the connection to the exhaust tube air-tight. The said mechanism comprises a post 19 on arm 20 of shaft 21 and is first raised into the position shown. This movement raises the post 19 to a position adjacent a pin 22 on the turret head and brings the insert 23 on arm 20 against the end of the lamp, pushing it into the turret head the required amount. Having reached the upper position, the shaft 21 is rotated, causing the post 19 to engage the pin 22 on collar 24, which results in a rotation of sleeve 25. The said sleeve is threaded to the head or chuck 11 and, as it is turned, it moves upward on said head, causing the ball bearing 18 to compress the washer 16. The said washer 16, which is preferably of rubber, expands sideward making a gas-tight seal between the exhaust tube and the walls of the turret head. The rotation of shaft 21 results from a movement of bushing 26 (Fig. 2) in bracket 27, said bushing engaging said shaft through keys 28 and 29. The movement is passed to bushing 26 from bushing 30 which surrounds another portion of shaft 21 and turns in another portion of bracket 27. The connection between bushings is made by a spring 31 which engages pins 32 and 33 in collars 34 and 35 respectively which are clamped to the respective bushings. Bushing 30 is turned by another portion of the machine, hereinafter described, through the arm 36 which is clamped thereto, and link 37. The vertical movement of shaft 21 results from mechanism which is operated by cam 38, and engages the flanged portions 39 of a stud 40 in the end of said shaft. The said flanges are engaged by pins 41 in the arms of a lever 42 which is attached to the shaft 43 in bracket 44. The shaft is turned by a lever 45 which connects through link 46 to a lever 47 which in turn, through roller 48, engages the cam 38. Lever 47 turns about a pin 49 in a stationary member (not shown) which is attached, like bracket 27, to the table 50. The table in this instance, like shaft 51 on which cam 38 is mounted, is a portion of an exhaust machine to which this machine is connected. In order that the roller 48 will follow the contour of the cam, a spring 52 is provided which extends between a post in bracket 27 and an arm of lever 45.

The chuck closing mechanism now drops to its lower position, whereupon the turret is indexed, advancing the heads one position. The turret 10 is fastened to tube 53 and rides on ball bearing 54 located between it and bracket 27. The indexing operation is performed by mechanism (not shown) operating through chain 55 which engages a sprocket 56 on the lower end of the tube 53. The indexing operation causes air pressure to be applied to the lamp because the resilient rubber diaphragm 57 above the head 11 is forced downward by the pressure of air let into the upper chamber 58 by a rotary valve 59. The valve comprises two parts, a movable lower part 60 which is attached to tube 53 and a stationary upper part 61 which engages a rod 62 in the tube 53 through a key and ways (not shown). The valve halves are kept in contact with each other by springs 63 located between the upper half of the valve and the collar 64 which is attached to the rod 62. A fluid, preferably air, is introduced into an annular passage 66 in the upper half of the valve through a pipe 67 from a source which is not shown, and passes to ports 68 in the lower half leading to each of the heads carrying a lamp which is being tested. The port 68 communicating with the particular head 11 which is indexing out of position x, passes out from under a solid portion of the upper valve half 61 and passes under the passage 66 in the said half. The air in passage 66 then passes through port 68, pipe 69 union 70, and a passage in upper bell housing 71, to chamber 58. The air pressure forces the diaphragm 57 down onto the bottom of the lower bell housing 72 which compresses the air confined in the chamber 73 and lamp 12 and the passages therebetween and creates a pressure in said lamp. The said passages include a passage 74 in the lower bell housing and a passage 75 in the turret head 11. The air is also compressed in an auxiliary passage 76, also in the lower bell housing and partly filled by screw 77, and a passage (not shown) connecting to a pressure operated switch 78. The lower bell housing 72 and the turret head 11 are connected together by a section of hose 79, and said housing 72 and the switch 78 are connected together by a hose 80. The screw 77 can be turned in or out to change the volume of the passages, thereby effecting a change in the pressure applied to the lamp. The switch 78, as shown in Fig. 3, operates on the Bourdon gage principle and comprises a control element consisting of an elastic curved tube 81 with one end closed and the other end attached to the frame 82. Passages (not shown) in the said frame 82 allow the air passed to the switch from the bell housing chamber 73 to enter the tube 81. The movements of the free end of the tube are transmitted through a link 83 to the lever 84, which carries an arm 85 on which a contact 86 is mounted. The lever 84 is attached to a pin 87 which pivots in plates 88 and 89, and is kept under the tension of a spring 90 extending between an arm on said lever 84 and a pin 91 attached to the plates 88 and 89. Plate 89 is attached to the frame 82 and plate 88 is attached to plate 89 by pins 91 and 92. The air pressure in the lamp and the respective passages, and tube 81 keeps said tube expanded and keeps contact 86 away from a stationary contact 93 which is mounted on the insulating portion 94 of the arm 95 extending from the housing 96. The air pressure is maintained in the lamp until the head 11 indexes into position y, when the port 68 in the lower half 60 of the rotary valve 59 comes under a solid portion of the stationary upper half 61 thereof.

In case the lamp 12 has a leak therein, the air pressure is of course reduced and the tube 81 in switch 78 contracts, causing contact 86 to engage the contact 93 and close the circuit shown in Fig. 4 to actuate mechanism which prevents the unloading mechanism 97 from removing the lamp from the head 11. The said contacts 86 and 93 are electrically connected to respective pins 98 and 99 in insulating washers 100 in the web of the turret 10 (Fig. 1). During the indexing motion, said pins 98 and 99 contact similar circuit-making contact pins 101 and 102 in an arm 103 extending from bracket 27. Pin 101 is connected to one terminal of a source of electricity and pin 102 is connected to the solenoid 104 which is connected to the other terminal of said source. When pins 98 and 99 engage pins 101 and 102, if a leaky lamp is present in the head to which the connections are made, current will pass through the solenoid and the armature 105 thereof will be moved. As the armature moves, lever 106 which is connected thereto through link 107, is pivoted, thereby lifting the stop rod or pin 108 into the path of the unloading mechanism 97. The stop rod 108 prevents the unloading mechanism from swinging under the turret as it normally does when a lamp passing the test is contained in this head. If the lamp passes the leakage test, the indexing of the turret carries it into the jaws of the unloading mechanism 97 then located at position y, and said jaws grip the lamp. The release of the lamp is then effected by a rotation of sleeve 25 on head 11 which causes the pressure on washer 16 to be released. This rotation is effected by a post 109 (Fig. 1) engaging the pin 22, and is produced by the rotation of a shaft 110 on which an arm 111 carrying post 109 is mounted. The shaft 110 is mounted in arms on the bracket 27 and is turned by a shaft 112 through the engagement of gears 113 and 114. Shaft 112 is rotated by a lever (not shown) which is actuated by a rod 115 which in turn is operated by mechanism not shown. An arm 116 on shaft 110 is connected to link 37 which operates the chuck closing mechanism at position x simultaneously with the releasing operation at position y.

The unloading mechanism 97 is actuated to pull a good lamp from the test turret head 11, swing it away therefrom and insert it into the head of an exhaust machine (not shown) located adjacent thereto. These movements of the unloading mechanism 97 are produced by corresponding movements of a rod 117 to which said mechanism is attached and which is actuated by cam operated mechanism not shown. The defective lamps which are not picked up by the unloading mechanism 97 upon being released by the turret head 11 fall onto a chute 118 leading to a suitable receptacle.

What we claim as new and desire to secure by Letters Patent of the United States is:

1. An apparatus for testing bulbs for electric lamps and similar articles having exhaust tubes extending therefrom comprising a support for gripping the exhaust tube of a bulb and making an airtight connection therewith, a bell housing adjacent said support having a resilient diaphragm extending thereacross and dividing said housing into two chambers each adapted to hold a fluid, said support having a passage therein for connecting one of said chambers with the interior of said bulb, a pressure operated switch adjacent said chamber having a control element consisting of a curved tube having one end free to be moved by changes of pressure therein and communicating with said one of the chambers by a passage, the said fluid being confined in said chamber, bulb, switch control element and passages, means for exerting a fluid pressure within the other chamber to cause the said diaphragm to be stretched and forced inwardly thus compressing the fluid in the first-mentioned chamber, and mechanism including said pressure operated switch for causing a bulb to be discarded in case the pressure of the confined fluid in the said first-mentioned chamber is not increased sufficiently because of a leak in said bulb.

2. An apparatus for testing containers for leaks comprising a rotatable turret, a plurality of heads mounted on said turret and each adapted to support a container, a bell housing adjacent each of said supports having a resilient diaphragm extending thereacross and dividing said housing into two chambers, each of said heads having a passage therein extending to one of said chambers, the other end of said passage extending to an opening in said container but being open to the atmosphere when a container is not present in said head, an air pressure operated switch adjacent each of said one of the chambers having a control element communicating therewith by a passage, the air being confined in said one chamber, container, switch control element and passages, a rotary air valve on said turret having an annular passage adapted upon rotation of the turret to communicate with passages extending to each of the other chambers of said housings and thereby allow the passing of compressed air to each of said second-mentioned chambers to cause the said diaphragm to be stretched and forced inwardly thus compressing the air in each of the first-mentioned chambers, and mechanism including said air pressure operated switch for causing a container to be discarded in case the pressure of the air in the said first-mentioned chamber is not increased sufficiently because of a leak in said container.

3. In a device of the type described, a rotatable turret, a plurality of heads mounted on said turret and each adapted to support a container to be tested for leaks, means for exerting a fluid pressure in said containers upon rotation of said turret, a pressure operated switch adjacent each of said heads on said turret having a control element consisting of a curved tube having one end free to be moved by changes of pressure therein and communicating with the interior of the container in the adjacent head, a stationary electrical contact mounted adjacent each of said switches, a movable contact arm in each of said switches connected to the movable end of the control element thereof and normally engaging the adjacent stationary contact but separable therefrom upon movement of said end of said control element, a pair of contacts mounted on said turret adjacent each of said heads and electrically connected to said movable contact arm and stationary switch contact respectively, a pair of stationary circuit-making contacts disposed adjacent the path of movement of said pairs of turret contacts and adapted to engage said turret contacts, transfer mechanism disposed adjacent said turret at an unloading position of said heads, a movable rod disposed adjacent said transfer mechanism, a solenoid comprising a coil and an armature connected to said rod, and an electrical circuit for each of said switches including its movable contact arm, stationary switch contact, turret contacts, the stationary circuit-making contacts and the solenoid coil, whereby when the pressure of the fluid in a container is not increased sufficiently because of a leak therein the movable end of the switch control element fails to move a sufficient amount to separate the said contact arm from the stationary switch contact and the said solenoid is energized, thereby causing the solenoid armature to move the said rod into the path of movement of the said transfer mechanism to prevent said mechanism from engaging and transferring a leaky container.

4. In a device for testing bulbs for electric lamps and similar articles having exhaust tubes extending therefrom, the combination of a turret rotatably mounted on a vertical axis, a plurality of vertically disposed chucks mounted at the periphery of said turret and adapted to grip the ends of the exhaust tubes of bulbs inserted in the lower ends thereof, means for indexing said turret, means for creating air pressure in the bulbs held by said chucks, a pressure operated switch adjacent each of said chucks and having a movable control element communicating with the interior of the bulb held by the said adjacent chuck, a pair of transfer jaws located adjacent to the path of travel of said chucks and adapted to be moved to and from said chucks to grip a bulb and carry it away from the testing device, a discharge chute located adjacent to said transfer jaws, a rod located adjacent to said transfer jaws, a solenoid attached to said rod, means for releasing the bulbs held by said chucks, and an electrical circuit including said solenoid and said pressure operated switches for causing said rod to be moved in the path of movement of said transfer jaws by said solenoid when one of the bulbs has a leak therein thereby preventing said jaws from moving into gripping position permitting the defective bulb to drop in said discharge chute instead of being carried from the testing device by said jaws.

5. In a device for testing bulbs for electric lamps and similar articles having exhaust tubes extending therefrom, the combination of a turret rotatably mounted on a vertical axis, a plurality of vertically disposed chucks mounted at the periphery of said turret, each of said chucks having a resilient washer in the lower end thereof for holding the exhaust tube of a bulb, a screw-threaded sleeve on said chuck having a portion adapted to compress said washer when said sleeve is rotated, a pin mounted on said sleeve, means for indexing said turret, a vertically disposed post mounted adjacent to the path of travel of said chucks at an indexing position of said turret, the upper end of said post being adjacent to the pin on a chuck at said indexing position, means for rotating said post about an offset axis to cause it to engage said pin and rotate the said sleeve on said chuck and thereby compress said resilient washer against the exhaust tube held therein, means for creating air pressure in the bulbs held by said chucks, a pressure operated switch adjacent each of said chucks and having a movable control element communicating with the interior of the bulb held by the said adjacent chuck, a pair of transfer jaws located adjacent to the path of travel of said chucks and adapted to be moved to and from said chucks to grip a bulb and carry it away from said testing device, a discharge chute located adjacent to said transfer jaws, a second vertically disposed post located adjacent to the path of travel of said chucks and to said transfer jaws at an indexing position of the turret, the upper end of said second post being adjacent to the pin on a chuck at said last named indexing position, means for rotating said second post about an offset axis to cause it to engage said pin and rotate the sleeve on said chuck and thereby release the pressure on the resilient washer therein, and mechanism including the pressure operated switch adjacent said chuck for preventing the said transfer jaws from gripping the bulb in said chuck when it has a leak therein thereby permitting the defective bulb to drop in said discharge chute instead of being carried from the testing device by said jaws.

6. In a device for testing bulbs for electric lamps and similar articles having exhaust tubes extending therefrom, the combination of a turret rotatably mounted on a vertical axis, a plurality of vertically disposed chucks mounted at the periphery of said turret, each of said chucks having a resilient washer in the lower end thereof for holding the exhaust tube of a bulb, a screw-threaded sleeve on said chuck having a portion adapted to compress said washer when said sleeve is rotated, a pin mounted on said sleeve, means for indexing said turret, a vertically disposed shaft mounted adjacent to and below the path of travel of said chucks at an indexing position of said turret, a vertically disposed post mounted on said shaft and offset axially therefrom, the upper end of said post being adjacent to the pin on a chuck at said indexing position, means for raisig said shaft to cause the upper end thereof to engage a bulb and push it further into said chuck, means for rotating said post about the axis of said shaft to cause it to engage said pin and rotate the said sleeve on said chuck and thereby compress said resilient washer against the exhaust tube held therein, means for creating air pressure in the bulbs held by said chucks, a pressure operated switch adjacent each of said chucks and having a movable control element communicating with the interior of the bulb held by the said adjacent chuck, a pair of transfer jaws located adjacent to the path of travel of said chucks and adapted to be moved to and from said chuck to grip a bulb and carry it away from said testing device, a discharge chute located adjacent to said transfer jaws, a second vertically disposed post located adjacent to the path of travel of said chucks and to said transfer jaws at an indexing position of the turret, the upper end of said second post being adjacent to the pin on a chuck at said last named indexing position, means for rotating said second post about an offset axis to cause it to engage said pin and rotate the sleeve on said chuck and thereby release the pressure on the resilient washer therein, and mechanism including the pressure operated switch adjacent said chuck for preventing the said transfer jaws from gripping the bulb in said chuck when it has a leak therein thereby permitting the defective bulb to drop in said discharge chute instead of being carried from the testing device by said jaws.

JOHN F. DONOVAN.
GEORGE ILLINGWORTH.